Aug. 18, 1925.
A. A. MOSES
1,550,562
SNAP FASTENER HOLDER
Filed Oct. 7, 1921
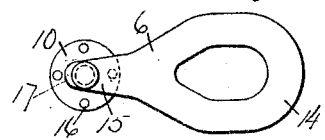
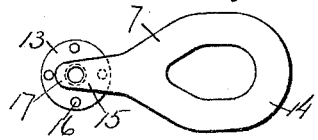
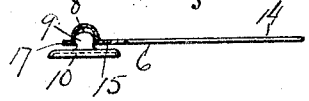
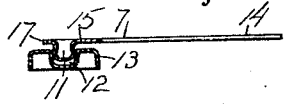
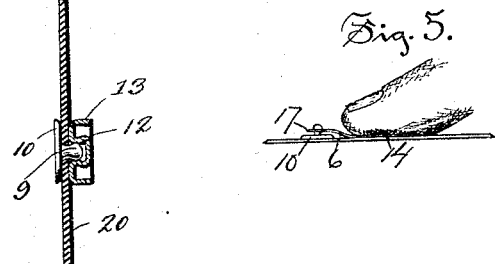
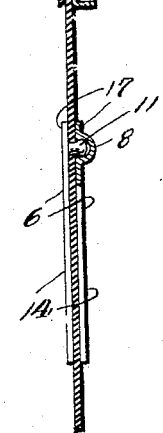
INVENTOR
Alice A. Moses.
by Arthur C. Jenkins,
ATTORNEY.

Patented Aug. 18, 1925.

1,550,562

UNITED STATES PATENT OFFICE.

ALICE A. MOSES, OF POWNAL, VERMONT.

SNAP-FASTENER HOLDER.

Application filed October 7, 1921. Serial No. 506,136.

*To all whom it may concern:*

Be it known that I, ALICE A. MOSES, a citizen of the United States, residing in Pownal, in the county of Bennington and State of Vermont, have invented a new and Improved Snap-Fastener Holder, of which the following is a specification.

My invention relates to devices for holding snap fasteners while being sewed to a garment, and an object of my invention, among others, is to provide a device of this class by means of which a snap fastener may be conveniently held while being fastened in place on a garment.

One form of my improved holder, in the construction and use of which the objects herein set out, as well as others, may be attained, is illustrated in the accompanying drawings, in which—

Figure 1 is a face view of the socket member of my improved holder illustrating its manner of use.

Figure 2 is a similar view of the stud member of my improved holder.

Figure 3 is a view in central lengthwise section through the parts shown in Figure 1.

Figure 4 is a view in central section through the parts shown in Figure 2.

Figure 5 is a view, scale reduced, illustrating the manner of retaining the fastener by my improved holder.

Figure 6 is a vertical sectional view of a portion of a card, carrying separable fastener members and the holders.

In the operation of securing snap fasteners to garments, and more especially of ladies' wear, which fasteners are generally composed of two members, much difficulty is found in sewing them in place, and this difficulty is increased when it is noted that such members must be accurately placed else the fit of the garment will be impaired.

Prior to my invention, so far as is known by me, the thumb, or possibly a finger, has been placed upon a fastener member to hold it in place while being sewed to the garment, but the fastener members are so small that a secure hold cannot be obtained upon the member while the needle is being passed through the holes made for the thread, and, therefore, the operation of thus securing a fastener member in place is quite difficult and very inconvenient.

It is to obviate this difficulty that I have devised the present invention which embodies two holder members 6 and 7, the holder member 6 having a socket or fastening element 8 to fit and snugly engage the stud or fastening element 9 of a stud fastener member 10, and the member 7 having a stud 11 to fit and snugly engage the socket 12 of a socket fastener member 13. Each holder member comprises an elongated thumb piece 14 having a relatively narrow tongue 15 projecting therefrom which is provided adjacent its outer end with the stud or socket fastening element 8 or 11 of the holder, the said thumb piece being in a convenient position to be pressed upon by the thumb or a finger of the person attaching a snap fastener to a garment so that the snap fastener member will be held flatly against the garment and the thumb piece will be flexed to similarly engage the same. The narrow tongue 15 of the holder members is of a width to uncover the holes 16 in the snap fastener members so that a needle may be readily passed through said holes in the operation of attaching the snap fastener members to a garment. The portion of the tongue 15 of each of the holder members positioned outwardly of the socket or stud elements is adapted to be used as a detaching lip by means of which lip the holder member may be detached from the snap fastener member. It is intended that the holder members be formed from a sheet of comparatively thin material by a suitable stamping operation with the socket or stud fastening element 8 or 11 struck out of the tongue portions 15.

It is common practice, in putting up the snap fastener members for sale, to attach them to cards 20 by means of the stud on the stud member of the fastener member that is passed through a hole in the card and that thereafter receives the socket member of the fastener. It is my purpose to so construct the socket and stud members of my improved holder that the stud on the stud member of the holder will snugly fit within the socket on the socket member of my improved holder and in this way the holder members may be secured to a card 20 in the same manner that the snap fastener members are secured thereto and each card of fastener members may, therefore, be readily supplied with a complete holder comprising a socket and a stud holder member as illustrated in Fig. 6.

While I have shown and described herein the two holder members in separate pieces I contemplate a structure in which they need not necessarily be so formed, as any device or devices embodying a structure herein illustrated and described for engaging the socket and stud members of snap fasteners will be within the spirit and intent of the invention.

I claim—

1. A holder for retaining a member of a two-part snap fastener in position while being attached to a garment comprising a holder having a finger grip at one end and means carried by the other end of the holder for snugly engaging and retaining the member of the two-part snap fastener.

2. A holder for retaining a member of a two-part snap fastener in position while being attached to a garment comprising a holder having a finger grip at one end, means carried by the other end of the holder for snugly engaging and retaining the member of the two-part snap fastener, and a lip extension carried by the holder outwardly of the snap fastener engaging means to facilitate forceful separation of the holder from the snap fastener member after the latter has been attached to a garment.

3. Means for holding the separable members of a two-part snap fastener in position while being attached to a garment comprising a pair of holders, one of said holders having a socket in one end and a stud carried by one end of the other holder forcibly positioned in the socket of the first named holder, and a card for supporting the holders having an opening therein through which the connected stud and socket extends with the card positioned between the two holders.

ALICE A. MOSES.